Aug. 16, 1927.

A. F. MASURY ET AL 1,638,948

FRAME FOR VEHICLES

Filed Oct. 3, 1924

Inventors
Alfred F. Masury and
Irving R. Gurney
By their Attorneys
Redding, Greeley, O'Shea and Campbell Aug. 16, 1927.

A. F. MASURY ET AL 1,638,948

FRAME FOR VEHICLES

Filed Oct. 3, 1924

Alfred F. Masury
and
Erving R. Gurney
Inventors
By their Attorneys Redding, Greeley, O'Shea and Campbell Patented Aug. 16, 1927.

1,638,948

UNITED STATES PATENT OFFICE.

ALFRED F. MASURY, OF NEW YORK, AND ERVING R. GURNEY, OF BEECHHURST, NEW YORK, ASSIGNORS TO INTERNATIONAL MOTOR COMPANY, OF NEW YORK, N. Y., A CORPORATION OF DELAWARE.

FRAME FOR VEHICLES.

Application filed October 3, 1924. Serial No. 741,309.

This invention relates to frames for vehicles and more particularly to frames for motor vehicles.

The primary object of the invention is to provide a chassis frame for heavy duty trucks, such as motor trucks and busses, which shall have that degree of strength and rigidity necessary to the duty, more especially in vehicles provided with tandem or dual rear drives. In order that the chassis frame have sufficient strength to support the great weight imposed thereon, the longitudinal side frame members of the chassis are formed as channels of relatively great depth. To prevent, in the interest of stability, the disposition of the center of load of the vehicle at too great a height above the road bed due to the unusual depth of the side frame members, portions thereof are cut away to receive the driving axles and permit freedom of movement therein. Such cut-away portions weaken, to a certain extent, the longitudinal side frame members of the chassis and one aspect of the invention contemplates the re-enforcement of the side members so as to compensate for this reduction in strength. Accordingly, longitudinally extending brackets or re-enforcing elements are secured outwardly of the side frame members of the chassis to span the weakened areas. These brackets are ideally situated to provide seats for cushion connections between the chassis frame and the spring suspension. To this end each supplemental re-enforcing bracket carries the housings for the cushion connections of one of the springs of the spring suspension. Weaving of the chassis frame when the vehicle passes over inequalities in the road impresses strains and stresses on the body and tends to disrupt the connections between the component parts of the chassis frame. A further object of the invention is to strengthen the frame and increase its rigidity whereby weaving is, in major part, overcome. This object is realized by a supplemental frame of re-enforcing elements, preferably tubular, disposed within the chassis frame at the rear end thereof and connected at three points to the side frame members. More specifically, a transversely extending tubular re-enforcing member is connected by brackets at its ends to the side frame members of the chassis rearwardly of the driving axles. Adjacent the aforesaid brackets are secured brackets receiving the ends respectively of longitudinally extending tubular re-enforcement members which are secured at their forward ends to the side frame members of the chassis forwardly of the axles. By such construction a rigid re-enforcing frame is provided interiorly of the chassis frame in that region directly supported by the driving axles and the frame not only lends the desired rigidity to the chassis but re-enforces to a degree that portion weakened by the cut-away areas.

The wheel base of vehicles, and particularly motor busses, varies considerably, dependent upon the carrying capacity or seating capacity of the particular bus. Another object of the present invention is to provide a chassis construction which can be manufactured according to recognized automotive standards and which can be assembled to give the desired wheel base with a minimum of operations. Accordingly, the longitudinal side frame members of the chassis are formed in sections, one of said sections being adapted to receive the spring suspensions for the driving wheels and another of said sections forming the forward portion of the frames. One of the sections, or if desired, both sections are so formed as to be readily cut off to the desired length and the two sections may then be joined by suitable connections to form a longitudinal side frame chassis member of conventional configuration.

These and other objects of the invention will be more apparent from the following detailed description of a preferred embodiment illustrated in the accompanying drawings and in which.

Figure 1:
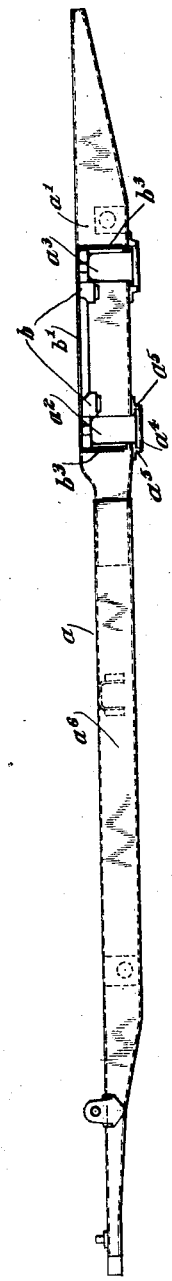
Figure 1 is a view in side elevation showing the chassis frame according to the present invention.
Figure 2:
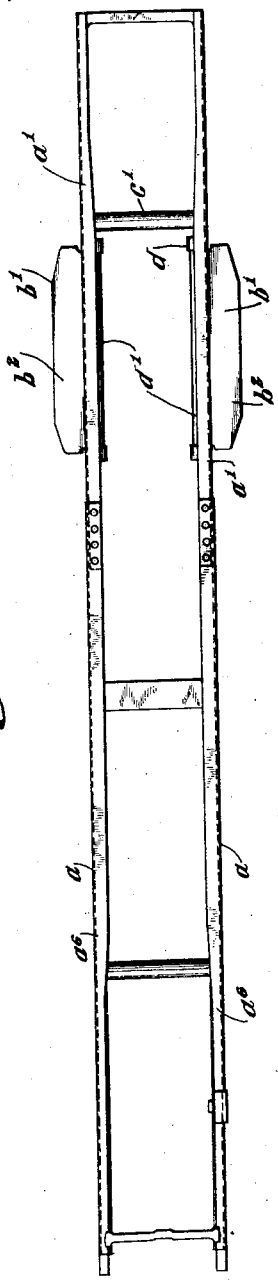
Figure 2 is a plan view of the chassis showing the re-enforcing elements and the means for adjusting the wheel base of the vehicle.

Referring more particularly to Figures 1 and 2 it will be observed that the side frame members $a$ of the chassis are formed as channels in the usual manner. The rear end $a'$ of the side frame members are however formed of increased depth in the interest of greater strength to support the heavy loads for which the chassis is designed. The chassis frame is designed particularly for application to vehicles of the dual rear axle drive. In such drives a pair of driving axles arranged in tandem near the rear end of the vehicle support by means of any convenient spring suspension the rear end of the chassis frame. As is customary in vehicles of this nature and particularly with busses the chassis frame is swung as close to the ground as possible in order to lower the center of gravity of the vehicle in the interest of stability. In order to permit such disposition of the chassis frame, portions of the side frame members are cut away to receive as at $a^2$ the forwardly disposed driving axle and at $a^3$ the rearwardly disposed driving axle. As a re-enforcement of the area weakened by the cut-away portions $a^2$, $a^3$, respectively, rods $a^4$ are secured by brackets $a^5$ to the flange to bridge the cut-away portions.

In the present instance it is proposed to support the chassis frame from the dual driving axles through a spring suspension comprising compound springs, the ends of the lower inverted semi-elliptic spring (not shown) being carried with the respective axles disposed in the apertures $a^2$, $a^3$ and an upper semi-elliptic spring secured at its mid-point to the mid-point of the lower spring and engaged at its ends by blocks of yielding non-metallic material carried within the housings $b$. These housings may conveniently be supported from brackets $b'$ secured in any convenient manner, as by welding or rivets, to the outer faces of the side frame members. The brackets $b'$ are formed of a longitudinally extending horizontal plate portion $b^2$ and vertical portions $b^3$ depending from either end thereof, the bracket being of such size and being so secured to the outer face of the channel member that the depending portions $b^3$ are secured thereto upon opposite sides of the axle openings $a^2$, $a^3$ in a manner to embrace the same and afford considerable strength to the area affected by the cuts. As a further re-enforcement for the brackets $b'$ tubular re-enforcing brackets $b^4$ may, if desired, be secured to the channels above the cut-away areas.

As a means for further strengthening the chassis frame and increasing its rigidity it is proposed to provide what is in effect a supplemental three sided frame of tubular members secured respectively forwardly of the axle openings $a^2$ and rearwardly of the axle openings $a^3$. In rear of the openings $a^3$, interiorly of the channel webs are secured brackets $c$ adapted to receive a transversely extending tubular re-enforcing element $c'$ which is secured to the webs substantially midway between the flanges. Adjacent the transverse tube $e'$ but in close proximity to the upper flange are disposed brackets $d$. These brackets are also on the inner side of the web of the respective channels and receive the rear ends of forwardly extending tubular re-enforcing elements $d'$ which are seated at their forward ends respectively in brackets $d^2$ carried with the interior of the channel webs just forwardly of the axle openings $a^2$.

Figure 3:
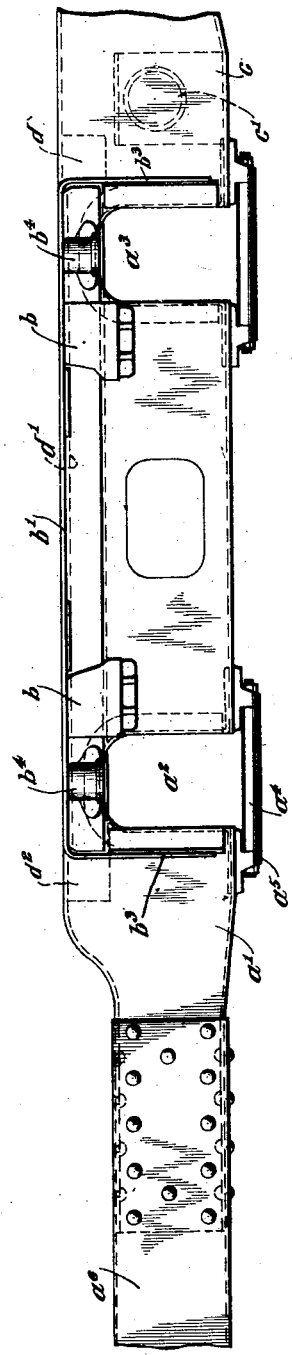
Figure 3 is a fragmentary view in side elevation and on an enlarged scale showing so much of a chassis side frame member as is necessary to indicate the manner of adjustment of the overall length of the chassis and the means for its re-enforcement.
Figure 4:
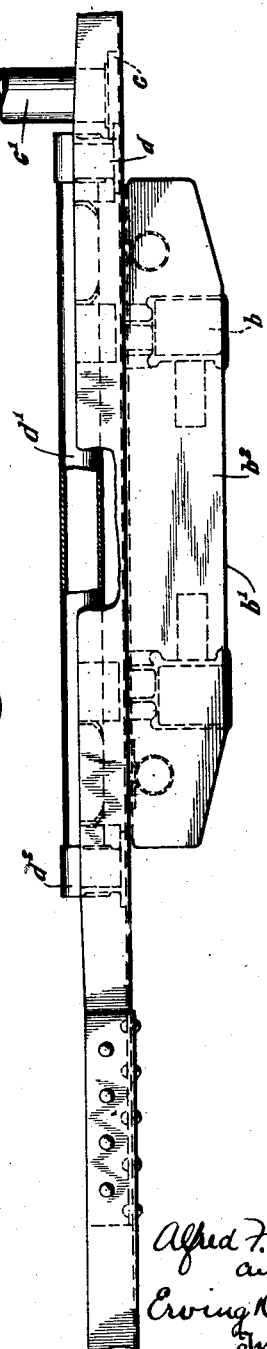
Figure 4 is a view of the structure disclosed in Figure 3 but looking from above.

At the present time motor bus manufacturers are compelled to carry a great variety of chassis side frame members in stock or else manufacture to order the side frame members since the overall length of the chassis varies considerably depending upon the desired seating capacity of the bus ordered. To obviate this inconvenience it is proposed to form each side frame member of the chassis of two sections, a rear section $a'$ and a front section $a^6$, the forward end of the section $a'$ being slightly reduced in depth whereby the web and flanges of that section may be telescoped within the web and flanges of the front section $a^6$. The desired length of bus chassis may thus be easily attained by cutting off a section from the rear end of the front section $a^6$, telescoping the proximate ends and riveting them together as will be clearly understood from an inspection of Figures 3 and 4.

Other portions of the bus body such as the transverse frame members, motor supports and the like have not been described since they form no part of the present invention and may take any conventional form.

It will thus be seen that a chassis frame construction has been provided which permits a low hung chassis of the requisite strength and rigidity and which can be readily assembled under standard automotive shop practice to the desired length.

Various modifications may be made in the configuration and manner of attachment of the re-enforcing elements as well as in the manner of securing complementary sections of the side frame members and no limitation is intended in the foregoing description except as indicated in the appended claims.

What we claim is:

1. In a chassis frame for motor vehicles, longitudinal side frame members formed with oppositely disposed cut-out portions respectively, a transversely extending bracing member connecting the side members adjacent the cut-out portions and longitudinally extending bracing members secured at one end respectively to the frame members adjacent the transverse brace, and at their other ends to the side frame members upon the opposite side of the cut-out portions.

2. In a chassis frame for motor vehicles, longitudinal side frame members formed with oppositely disposed cut-out portions respectively, a transversely extending tubular bracing member connecting the side frame members adjacent the cut-out portions and longitudinally extending tubular members secured at one end respectively to the frame members adjacent the transverse brace, and at their other ends to the side frame members upon the opposite side of the cut-out portions.

3. In a chassis frame for motor vehicles, longitudinal side frame members formed with a pair of oppositely disposed cut-out portions respectively, a transversely extending bracing member connecting the side frame members rearwardly of the cut-out portions, and longitudinally extending bracing members secured at one end respectively to the frame members adjacent the transverse brace, and at their other ends to the side frame members forwardly of the cut-out portions.

4. In a chassis frame for motor vehicles, longitudinal side frame members formed with a pair of oppositely disposed cut-out portions respectively, a transversely extending tubular member connecting the side frame members rearwardly of the cut-out portions and longitudinally extending tubular bracing members secured at one end respectively to the frame members adjacent the transverse brace, and at their other ends to the side frame members forwardly of the cut-out portions.

5. In a chassis frame for a motor vehicle, in combination, longitudinal side frame members formed with cut-out portions, respectively, a transverse brace connecting the side members near the cut-out portion and longitudinally extending braces disposed above the cut-out portions and secured to the side members, respectively, with one end of each near the transverse brace.

6. In a chassis frame for a motor vehicle, in combination, longitudinally side frame members formed with cut-out portions, respectively, a transverse brace connecting the side members near the cut-out portions, longitudinally extending braces above the cut-out portions and secured to the side members, respectively, with one end of each near the transverse brace, a second longitudinal re-enforcement secured to each side frame member above the cut-out portion, downwardly extending re-enforcements disposed upon opposite sides of the cut-out portion of each side member, respectively, and secured thereto, and means to bridge the cut-out portions of the respective side frame members.

This specification signed this 29 day of September, A. D. 1924.

ALFRED F. MASURY.
ERVING R. GURNEY.